W. R. GREEN.
BICYCLE OR MOTOR CYCLE SUPPORT.
APPLICATION FILED NOV. 29, 1912.
1,149,438.
Patented Aug. 10, 1915.
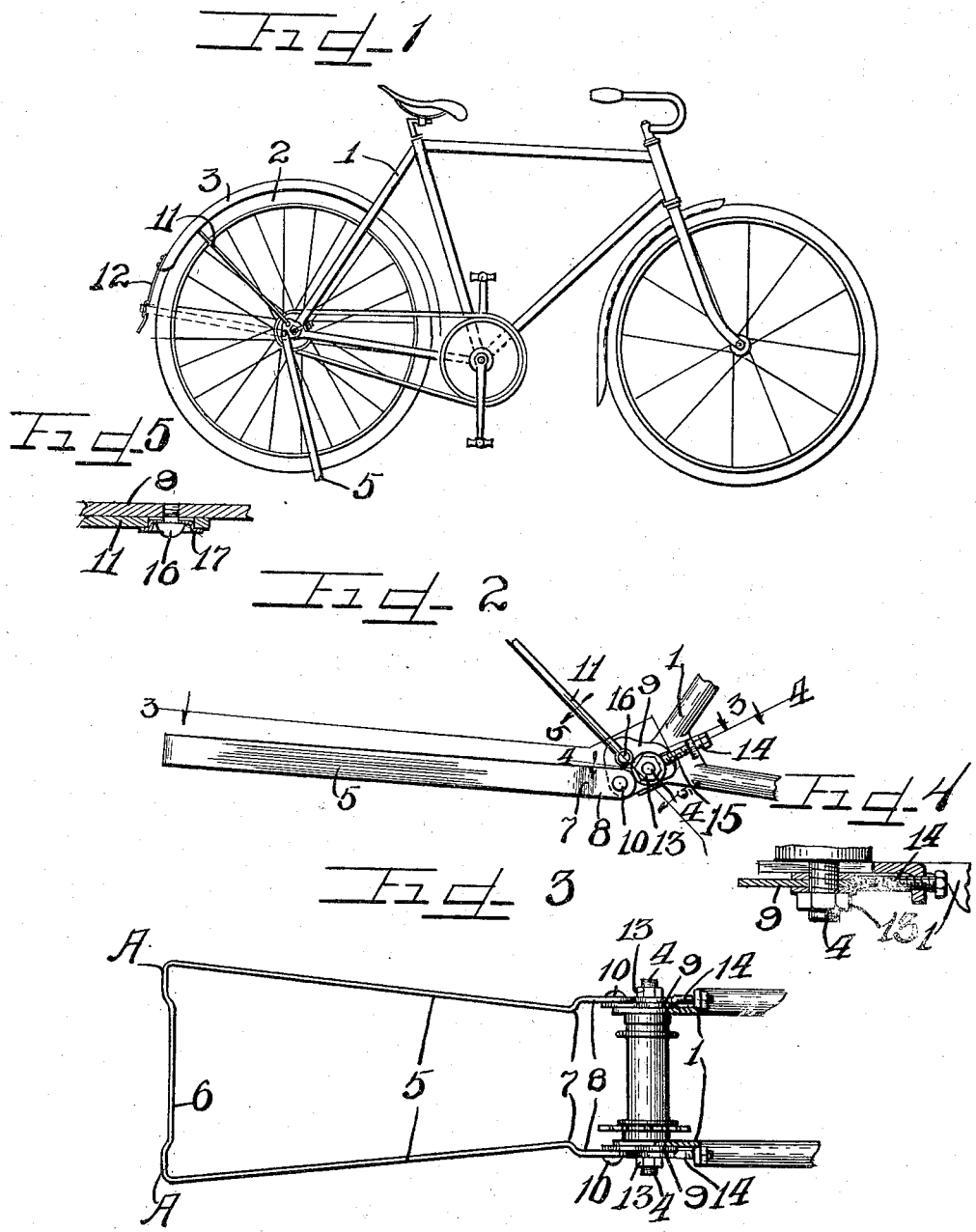

UNITED STATES PATENT OFFICE.

WALTER R. GREEN, OF CHICAGO, ILLINOIS.

BICYCLE OR MOTOR-CYCLE SUPPORT.

1,149,438.

Specification of Letters Patent.

Patented Aug. 10, 1915.

Application filed November 29, 1912. Serial No. 734,037.

*To all whom it may concern:*

Be it known that I, WALTER R. GREEN, a citizen of the United States, and a resident of the city of Chicago, in the county of Cook and State of Illinois, have invented certain new and useful Improvements in Bicycle or Motor-Cycle Supports; and I do hereby declare that the following is a full, clear, and exact description of the same, reference being had to the accompanying drawings, and to the numbers of reference marked thereon, which form a part of this specification.

The object of this invention is to afford a supporting bracket pivotally supported upon the bicycle or motorcycle and adapted to support the bicycle in upright position when not in use, and so constructed as to be swung up free from the ground and supported from use when desired.

It is also an object of the invention to afford a construction in which the supporting bracket may be assembled in place with the least possible trouble, and without previous experience, and in which the mud guard supporting plate is utilized in part to afford engagement of said device on the rear axle of the machine.

The invention (in a preferred form) is illustrated in the drawings and hereinafter more fully described.

In the drawings, Figure 1 is a side elevation of a bicycle equipped with a supporting device embodying my invention and showing the same in use. Fig. 2 is an enlarged fragmentary side elevation of the same, showing the supporting device swung upwardly from use. Fig. 3 is a section on line 3 of Fig. 2. Fig. 4 is a section on line 4 of Fig. 2. Fig. 5 is a section on line 5 of Fig. 2.

As shown in the drawings, 1, indicates the rear fork of the bicycle or motorcycle, 2, the rear wheel, 3, the mud guard, and 4, the axle, whereby the wheel is journaled in the rear fork, as usual.

The supporting device comprises a metallic bracket or stirrup 5, comprising a strap or bar of metal bent to afford a base 6, which is concave to insure the contact with the ground being effected near each side the bracket or support. From said base, said bar is bent upwardly to afford arms, which converge to near their free ends, and there preferably are slightly offset outwardly to afford shoulders 7, and brought into parallel relation, as indicated at 8, in Fig. 3. Plates 9, provided each with an aperture therethrough to receive the end of the axle 4, are secured to said parallel ends 8, of said support, and rivets 10, afford a pivotal connection therewith. The mud guard 3, is also connected with said plates 9, by means of stay rods 11. A depending spring latch 12, is secured on the rear end of the mud guard 3, in position to engage the end of the support when swung upwardly to the position shown in dotted lines in Fig. 1, or in full lines in Fig. 2.

In securing the device in place the nuts 13 are removed from the ends of the axle, and plates 9, are inserted thereover in such position that the adjusting bolts 14, will engage in the notch 15, in the same. The nuts 13, are then returned to place and are set to firmly clamp the plates 9, from movement, and the inner ends of the stay rods 11, for the mud guard then firmly secured to the plates 9, at a point above the rivet 10, and slightly at the rear of the axle 4. As shown in Figs. 2 and 5, the connection between the plate 9, and the stay rod 11, is effected by means of a screw 16, which extends through an aperture in the washer 17, and is threaded into said plate 9. The washer 17, as shown, is of a size and shape adapted to engage in the hole in the end of the stay rod 11, and is flanged to bear against the sides of said stay rod.

When it is desired to support the bicycle or motorcycle in upright position, the support is swung downwardly to the position indicated in Fig. 1, with its lower end directed forwardly past the center of support, and with its shoulders 7, in firm engagement with the lower edge of the respective plates 9, to prevent further forward swing of the support. The rear end of the bicycle is thus supported free from the ground, the shape of said support affording a two point contact with the road or surface and insuring stability.

When it is desired to use the bicycle or motorcycle, the same is moved forwardly until the support is at the rear of the line of the support and may then be engaged with the hand or foot and elevated into engagement with its latch which acts to support the same securely when upon the road.

I have shown but a preferred form of the invention, and I therefore do not purpose limiting the patent granted on this application otherwise than necessitated by the prior art.

I claim as my invention:

1. A device of the class described embracing a stirrup shaped support, a plate secured to each arm thereof and adapted for engagement over opposite ends of the axle of the rear bicycle or motor cycle wheel and to be firmly clamped thereon, a mud guard, bracing connections between said plates and said mud guard, a spring latch carried on the mud guard to engage the end of said support when swung upwardly out of use, and shoulders on said support for engaging the lower edges of said plates, when said support is swung down for use.

2. The combination with a motorcycle of a support pivotally mounted and carried thereon embracing a bar of metal bent to afford a concave base, and converging arms, offsets in said arms near the extremities thereof beyond which said arms extend in parallel relation, a plate pivotally engaged to the extremity of each arm and apertured to receive the ends of the rear axle of the motorcycle therethrough and adapted to be clamped in place thereon, a mud guard, rods connected with the mud guard and also with each of said plates, and a spring clip carried on the mud guard and adapted to hold said support out of operation when the motorcycle is in use.

3. A device of the class described embracing the combination of a bar of metal bent to stirrup shape and having the bottom concave on the under side and converging arms bent into parallel relation near their extremities to form shoulders, a plate pivotally connected on each arm at the inner side thereof and apertured to receive the ends of a motorcycle axle slidably therethrough, a mud guard, stay rods therefor connected therewith and with each one of said plates, and a spring clip on the rear end of the mud guard for holding the support normally out of action, said support acting when swung downwardly to afford a broad transverse bearing for the rear wheel to support the same out of contact with the ground.

4. In a bicycle device of the class described a mud guard, attaching plates having slots therein adapted to be engaged by the adjusting bolts of the bicycle to prevent movement of said plates and to effect an adjustment thereof, stay rods leading from the mud guard to said plates, a stirrup shaped supporting device having a concave bottom, shouldered arms thereon pivotally engaged on the respective plates and adapted to be connected thereby to the rear axle of the bicycle, with the extremities of said axle extending through apertures in said plates, the engagement of said supporting device on said plates being in such relation with the axle that slight forward swing beyond the center of support for the rear wheel acts to cause the shouldered portions of said arms to bear against the lower edge of the respective plates to brace said supporting device from further forward movement.

5. A device of the class described embracing a stirrup shaped support having shoulders thereon, a slotted and apertured plate, one secured to each arm of said stirrup shaped support, said apertures permitting slidable engagement of said plates over the ends of the axle of a motorcycle rear wheel with the adjusting bolts of the motorcycle engaging in the slots of said plates to maintain said plates in proper position to receive the shoulders on said supports bearing thereagainst when the support is swung beneath the rear wheel and slightly in advance thereof.

6. The combination with a motorcycle or bicycle of a support pivotally mounted and carried thereon and embracing a strap or bar of metal bent to afford a base, and converging arms, shoulders on said arms near the extremity thereof, a plate pivotally engaged to each arm and adapted to slidably receive the ends of the rear axle therethrough and to be engaged by the shoulders on the arms of the support, when said support is in supporting position.

7. A device of the class described embracing a bicycle or motorcycle, a strap of metal bent to afford a support and having converging arms, a shoulder on each arm, a plate pivotally engaged on each arm and adapted to slidably receive the ends of the bicycle or motorcycle axle thereinto after the removal of the axle nuts and spaced to engage the shoulders on the arms when the support is in supporting position.

In testimony whereof I have hereunto subscribed my name in the presence of two subscribing witnesses.

WALTER R. GREEN.

Witnesses:
 CHARLES W. HILLS, Jr.,
 LAWRENCE REIBSTEIN.